United States Patent [19]

Schanzenbach, Jr. et al.

[11] 4,064,764
[45] Dec. 27, 1977

[54] TRIP DEVICE FOR A ROTATING MACHINE

[75] Inventors: George P. Schanzenbach, Jr., Reading; David M. Mizikar, Mount Pleasant, both of Pa.

[73] Assignee: Carrier Corporation, Syracuse, N.Y.

[21] Appl. No.: 683,135

[22] Filed: May 4, 1976

[51] Int. Cl.² .......................... F16P 7/02; F16C 41/00
[52] U.S. Cl. ............................................. 74/2; 74/814
[58] Field of Search .................... 74/2, 814; 73/66, 67, 73/DIG. 1; 60/905

[56] References Cited

U.S. PATENT DOCUMENTS

| 2,506,270 | 5/1950 | Kidd | 74/2 X |
| 2,525,470 | 10/1950 | Baker et al. | 74/2 X |

Primary Examiner—Edgar W. Geoghegan
Attorney, Agent, or Firm—J. Raymond Curtin; Barry E. Deutsch

[57] ABSTRACT

A trip device to prevent continued operation of a rotating machine upon the occurrence of an undesirable operating condition includes a sensing element to sense the occurrence of the undesirable operating condition. The trip device further includes an operating arm normally spaced from the sensing element. The sensing element moves into contact with the operating arm upon the occurrence of the undesirable operating condition. The device further includes a trigger to lock the operating arm in its normal operating position, with the sensing element moving the arm relative to the trigger upon the occurrence of the undesirable operating condition. The trigger thereafter acts as a stop to maintain the operating arm in a position spaced from the sensing element.

9 Claims, 4 Drawing Figures

TRIP DEVICE FOR A ROTATING MACHINE

BACKGROUND OF THE INVENTION

This invention relates to a trip device employed to discontinue operation of a machine upon the occurrence of an undesirable operating condition.

It is well known to those skilled in the art that machines such as turbomachinery and other similar rotating devices, require protection to prevent such machinery from continued operation upon the occurrence of an undesirable operating condition. Various types of trip devices have heretofore been employed to initiate the desired stoppage of operation of the machine. For example, it is desirable to prevent a rotating machine from continued operation upon a thrust bearing failure or upon the occurrence of excessive wear of the thrust bearing whereby undesirable axial clearances are developed. Typically, a trip device is installed upon the shaft of the rotating machine whereby the trip device will initiate the stoppage of the machine upon the occurrence of the excessive axial clearance.

Once the trip device has performed its desired function and the machine is either stopped or an alarm sounded, it is desirable that the various operating arms of the device be maintained in positions whereby no damage thereto will occur. For example, in a trip device having a separate sensing member movable upon the occurrence of the undesirable operating condition, it is desirable that any trip mechanism brought into contact with the sensing element be thereafter maintained in spaced apart relation thereto once a trip signal has been generated. This decreases maintenance required to insure proper operation of the device, as well as increases the reliability thereof. Furthermore, it is desirable that the trip device be maintained in a tripped condition once the undesirable condition has developed. This insures that supervisory or maintenance personnel are alerted to the problem or malfunction.

SUMMARY OF THE INVENTION

Accordingly, it is an object of this invention to provide a novel trip device.

It is a further object of this invention to maintain an operating arm of a trip device in a position spaced from the sensing element of the trip device once a trip signal has been generated.

It is a further object of this invention to generate a trip signal upon the occurrence of an undesirable operating condition and to maintain an operating portion of the device in spaced apart relation from any rotating element to prevent damage to the operating portion.

It is a further object of this invention to maintain the trip device in a tripped state until the device is manually reset.

These and other objects of the present invention are obtained in a trip device operable to discontinue operation of a machine upon the occurrence of an undesirable operating condition and including means to sense the occurrence of the undesirable operating condition. A first operating arm is spaced from the sensing means during normal operation of the machine. The sensing means is moved into contact with the arm upon the occurrence of the undesirable operating condition. The device further includes trigger means to lock the operating arm in its normal operating position. The sensing means moves the operating arm relative to the trigger means upon the occurrence of the undesirable operating condition. Thereafter, the trigger means acts as a stop to maintain the operating arm in a position spaced from the sensing means to prevent any damage thereto.

DESCRIPTION OF THE PREFERRED EMBODIMENT

Figure 1:
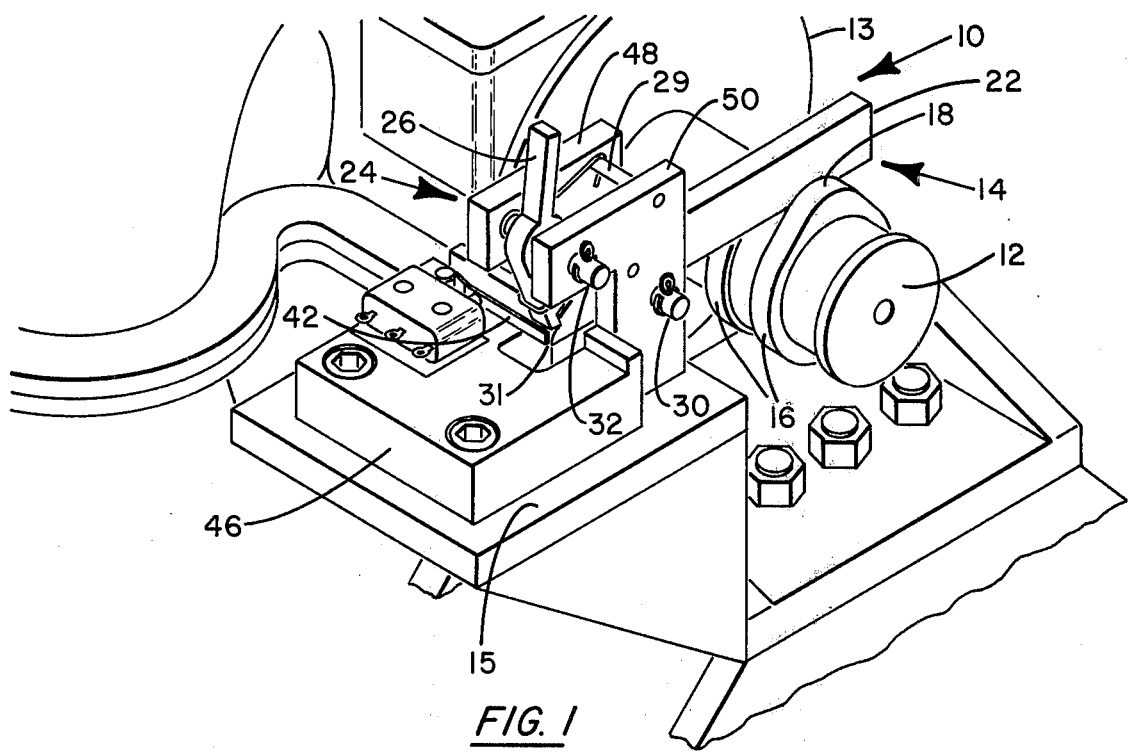
FIG. 1 is a perspective view of the trip device of the instant invention as installed on a suitable machine.

Referring now to the various figures of the drawing, there is disclosed a preferred embodiment of the present invention. In referring to the various figures, like numerals shall refer to like parts.

Referring particularly to FIG. 1, there is illustrated a trip device in accordance with the present invention as installed on a suitable rotary machine 10, for example a turbine. Machine 10 includes shaft 12 extending outwardly through end cover 13. Trip device 14 of the present invention is mounted upon a suitable support frame 15 of machine 10.

Trip device 14 includes cam members 16 each having a lobe 18 secured to the end of shaft 12. The cam member functions as a sensing means, as shall be more fully explained hereinafter.

Figures 2, 4:
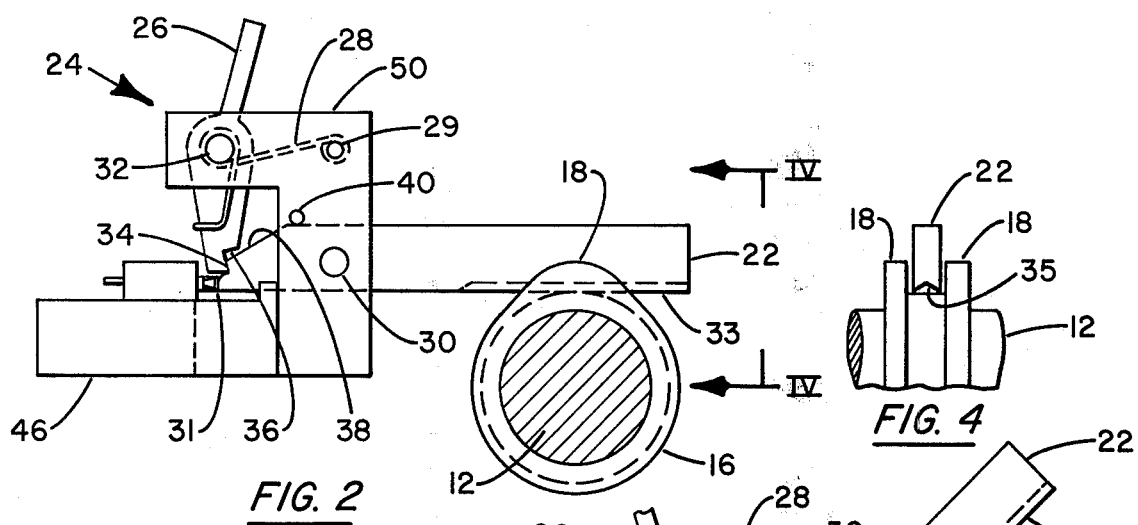
FIG. 2 is an end view, partially in section, of the trip device in its normal operating position.
FIG. 4 is a sectional view taken along line IV—IV of FIG. 2.

The trip device further includes a first operating arm or lever 22 which rides freely between the two cams 16 during normal operation of the machine, as is illustrated in FIG. 4. Lever 22 is preferably pivotable about pivot arm 30, which is substantially adjacent a first end 31 of the lever. End 31 of lever 22 preferably includes a step-like or grooved surface 34. As best illustrated in FIG. 4, bottom surface 33 of lever 22 preferably includes a V-shaped groove 35.

The trip device further includes pivotable trigger means 24 comprising a second operating arm 26 and a force generating means such as spring 28. Spring 28 is secured at either end to member 29, with the mid-section of the spring being in contact with arm 26. Spring 28 is designed to pivot arm 26 about pivot arm 32 in a counterclockwise direction as viewed in the various figures of the drawing. Preferably, arm 26 includes a step-like surface 36 of a similar configuration to step-like surface 34 of lever 22.

Pivot arms 30 and 32 are suitably mounted between side supports or brackets 48 and 50. The side supports are secured via welding or similar means to base plate 46, which may be suitably connected to the support structure of the rotating machine.

Lever 22 includes a ramplike surface 38. Stop 40, which extends between brackets 48 and 50, maintains lever 22 in a substantially horizontal plane during normal operation of the machine, with the lever being in spaced relation to the opposed surfaces of cams 16. In addition, stop 40 prevents arm 26 of trigger means 24 from pivoting beyond a predetermined point upon the occurrence of an undesirable operating condition.

Preferably, the trip device includes a switch 42 which is operable to either initiate an alarm or functions to provide an electrical signal to discontinue operation of the machine upon the opening thereof. Lever 22, when in its normal operating position, maintains switch 42 in a closed state.

Referring particularly to FIG. 2, the trip device is illustrated with the components thereof in their normal operating position. That is to say, machine 10 is functioning as designed. Lever 22 is disposed in spaced relation between the opposed surfaces of the two cams 16. Arm 26 is in essentially a vertical position, with surface 36 of the arm in engaging relation with surface 34 of lever 22. Spring 28 tends to pivot or rotate arm 26 in a counterclockwise relation to thereby positively secure surfaces 34 and 36 in mating engagement to lock lever 22 in its normal operating position. Switch 42 is in a closed state. If an undesirable operating condition should occur, for example excessive axial clearance caused by thrust bearing wear or failure, shaft 12 will move axially or in a horizontal plane to cause one of the two rotating cams 16 to come within the vertical plane of lever 22. Accordingly, lever 22 will be pivoted about pivot arm 30 in a counterclockwise direction. This will cause the disengagement of the step-like surfaces 34 and 36 of trigger arm 26 and lever 22. By providing V-shaped groove 35 in bottom surface 33 of lever 22, the lobe of the cam moved into vertical alignment with the lever will be forced into firm engagement therewith to provide a positive force to unlatch the lever.

Upon the disengagement of the step-like mating surfaces, trigger arm 26 will rotate about pivot arm 32 in the same direction as lever 22 has heretofore been pivoted. Accordingly, the trigger arm will move along ramplike surface 38 of lever 22 until it engages stop 40.

Figure 3:
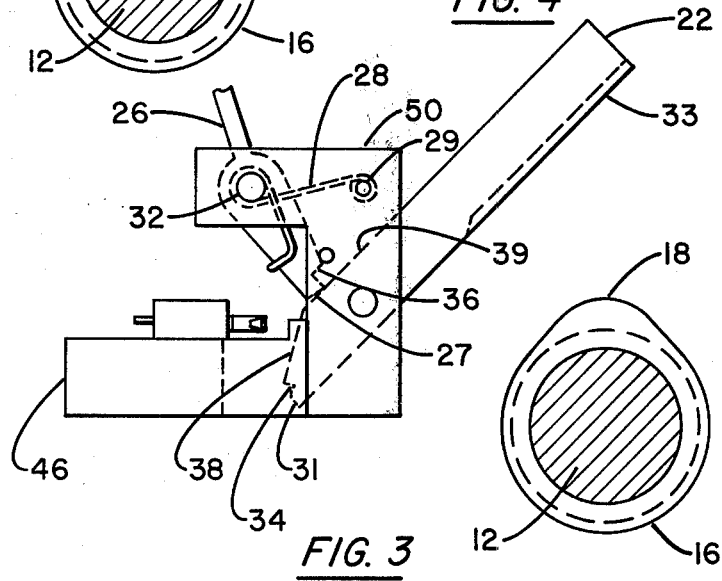
FIG. 3 is an end view, partially in section, illustrating the trip device in its tripped position.

As is illustrated in FIG. 3, trigger arm 26 moves along the ramplike surface and passes thereover to contact a second surface 39 of the lever. Lower surface 27 of arm 26 is in frictional engagement with surface 39 of lever 22. Thus, lever 22 is maintained in spaced relation to the continuously rotating cams 16 to thereby prevent damage to the cams or to the lever. Switch 42 opens upon the rotation of lever 22 to the position illustrated in FIG. 3, whereby machine 10 will either be stopped, or a signal will sound to alert supervisory personnel to the problem.

In order to reset trip device 14, it is necessary to manually rotate trigger arm 26 in a clockwise direction to permit lever 22 to also move in a clockwise direction. Once normal operation has resumed, lever 22 and trigger arm 26 will be engaged in the manner shown in FIG. 2.

The trip device of the instant invention provides a highly reliable and compact mechanism which insures that once tripped, the machine will remain in a tripped state until the trip device is manually reset. In addition, once placed in a tripped state, the various operating elements of the trip device are maintained in spaced apart relation with respect to each other to prevent damage thereto. Thus maintenance and repair work for such trip mechanism is maintained at a minimum.

While a preferred embodiment of the present invention has been described and illustrated, the invention should not be limited thereto but may be otherwise embodied within the scope of the following claims.

We claim:

1. A trip device to discontinue operation of a machine upon the occurrence of an undesirable operating condition comprising:

means to sense the occurrence of said undesirable operating condition;

a first operating arm spaced from said sensing means during normal operation of said machine, said sensing means moving into contact with said arm upon the occurrence of said undesirable operating condition; and trigger means to lock said operating arm in said normal operating position, said sensing means moving said arm relative to said trigger means upon the occurrence of said undesirable operating condition, said trigger means thereafter acting as a stop to maintain said operating arm in a position spaced from said sensing means.

2. A trip device in accordance with claim 1 wherein said sensing means includes cam means secured to a rotating element of said machine and movable into contact with said operating arm upon the occurrence of the undesirable operating condition.

3. A trip device in accordance with claim 2 wherein said trigger means includes a spring and a second operating arm rotatable by the force developed by said spring, said second operating arm being rotated by said spring upon the relative movement of said first operating arm.

4. A trip device in accordance with claim 3 further including a stop to prevent said second operating arm of said trigger means from rotating beyond a predetermined point.

5. A trip device in accordance with claim 4 wherein said stop is further operable to accurately locate said first operating arm in its normal operating position with respect to said sensing means.

6. A trip device in accordance with claim 1 wherein the surface of said operating arm contacted by said sensing means includes a V-shaped groove.

7. A trip device to discontinue operation of a rotating machine upon the occurrence of excessive axial clearance comprising:

a cam connected to a rotating portion of said machine;

a lever pivotable adjacent a first end having a step-like surface, the other end being spaced from said cam during normal operation of said machine, said cam being forced into contact with said lever upon the occurrence of the excessive axial clearance;

a pivotable trigger including force generating means to pivot said trigger in the same direction as the lever is pivoted by said cam, said trigger including a step-like surface at one end placed into engagement with said step-like surface of said lever to lock said lever in said normal operating position, said step-like surfaces being disengaged upon rotation of said lever, said trigger moving along a ramplike surface of said lever; and stop means to prevent rotation of said trigger beyond a predetermined point, a first surface of said trigger thereafter acting as a stop to maintain said lever in a position spaced from said cam.

8. A trip device in accordance with claim 7 wherein said stop means is further operable to accurately locate said lever in its normal operating position with respect to said cam.

9. A trip device in accordance with claim 8 wherein the surface of said lever contacted by said cam includes a V-shaped groove.

* * * * *